United States Patent [19]

Arnaud

[11] Patent Number: 4,528,816

[45] Date of Patent: Jul. 16, 1985

[54] TURBOCHARGED INTERNAL COMBUSTION ENGINE HAVING MEANS FOR CONTROLLING SUPERCHARGING PRESSURE

[75] Inventor: Henri Arnaud, La Ferte-Alais, France

[73] Assignee: Regie Nationale des Usines Renault, Boulogne-Billancourt, France

[21] Appl. No.: 428,657

[22] Filed: Sep. 30, 1982

[30] Foreign Application Priority Data

Nov. 26, 1981 [FR] France ............................ 81 22182

[51] Int. Cl.$^3$ .............................................. F02B 37/12
[52] U.S. Cl. .................................................... 60/602
[58] Field of Search .................. 60/600, 601, 602, 603

[56] References Cited

U.S. PATENT DOCUMENTS

| | | | |
|---|---|---|---|
| 2,474,203 | 6/1949 | Sparrow et al. | 60/602 |
| 2,621,472 | 12/1952 | Udale | 60/600 |
| 4,197,711 | 4/1980 | Fuhrmann et al. | 60/602 |
| 4,282,713 | 8/1981 | Antoku et al. | 60/600 |

FOREIGN PATENT DOCUMENTS

| | | | |
|---|---|---|---|
| 2362133 | 6/1975 | Fed. Rep. of Germany | 60/602 |
| 523 | 1/1981 | Japan | 60/602 |

*Primary Examiner*—Michael Koczo
*Attorney, Agent, or Firm*—Oblon, Fisher, Spivak, McClelland & Maier

[57] ABSTRACT

An apparatus for pneumatic control of supercharging pressure in a turbocompressed engine, characterized by the fact that the spring of a pneumatic actuator opens a dump valve, and that a collection pipe receives the pressure in the intake pipe above the butterfly valve and below the compressor and transmits the pressure to two parallel tubes, one leading to the closing chamber of the actuator, and the other leading through a throttling constriction to the opening chamber of this actuator, which chamber communicates through a tube and through a pressure valve with the atmosphere, while a third tube supplies the control chamber of the pressure valve.

8 Claims, 3 Drawing Figures

TURBOCHARGED INTERNAL COMBUSTION ENGINE HAVING MEANS FOR CONTROLLING SUPERCHARGING PRESSURE

BACKGROUND OF THE INVENTION

1. Field of the Invention

This invention relates to control of the dump-valve of turbocompressors.

2. Description of the Prior Art

It is known that heat engines supplied by a turbocompressor always include a dump valve bypassing the turbine side of the turbocompressor so that the supply pressure to the engine will not increase indefinitely to a dangerous level.

To control this dump valve, it is known to use a diaphragm-equipped pneumatic actuator with a return spring to close the valve, and to allow pressure collected at the outlet of the compressor portion of the turbocompressor to act in such a way as to open the actuator. This device has the advantage of being simple and allows the intake pressure of the engine to be regulated by means of a gradual release of pressure, while keeping said pressure from reaching a dangerous level.

It is also known that for low engine loads, pressure and exhaust gas output are not enough for the turbocompressor to provide a significant supply pressure. By contrast, beyond a certain threshold at which the turbocompressor starts to become effective, the supply pressure increases significantly, simultaneously increasing the filling rate and therefore the pressure and output of exhaust gas. By retroactive effect, the supply pressure continues to increase. Thus one moves starkly from the atmospheric phase into the supercharged phase, with the latter bringing on a posteriori, the intervention of the above regulating means. However, in spite of its simplicity the device mentioned above has the drawback that, in the atmospheric phase the turbine side of the turbocompressor constitutes an exhaust pressure drop which decreases the efficiency of the engine as well as cooling the exhaust gasses by increasing calorific losses, which is a disadvantage when an anti-pollution catalytic converter is used. It would therefore be preferable to eliminate both the pressure drop and the calorific loss during the atmospheric phase.

It is also known that a turbocompressed engine can, under transitory conditions, tolerate a supercharging rate much greater than that permitted under stabilized conditions. This is explained particularly by the fact that the temperature of the surfaces in contact with gasses in the engine is a priori not as high at the beginning of acceleration as under equivalent stabilized conditions and also by a better cooling capacity of the heat exchanger. Other factors, such as enrichment during acceleration, help to allow a momentary increase in the supercharging pressure limit. It would thus be preferable, in the simple device mentioned above, to delay the moment at which the dump valve comes into play during periods of acceleration.

In addition, for reasons of engine safety, the operation of the dump valve should allow the intervention solely of the pressure downstream of the butterfly valve, i.e., the actual supply pressure, which is generally lower than the pressure upstream for all positions of the butterfly valve except wide open, which also means restricting the operation of the dump valve.

SUMMARY OF THE INVENTION

The purpose of the invention is to eliminate the above drawbacks, i.e., to ensure that in the atmospheric phase, pressure drop and the calorific losses are eliminated, and that in the supercharged phase a delay in the opening of the dump valve is produced, simultaneous with an instantaneous safety command which will depend on the actual supply pressure.

The invention uses a dump valve having a pneumatic actuator of the usual type, but which is normally open, i.e., the return spring of the actuator is placed in the direction opposite the usual direction. This actuator, e.g., of the type having a diaphragm, thus comprises two control chambers, including a closing chamber, such that a pressure increase in said chamber provokes the closing of the valve, and an opening chamber located on the other side. Also contrary to usual practice, the calibration of this spring does not determine the supercharging pressure, with said calibration being much lower than usual.

The invention consists of gathering, through a collection channel, a reference pressure from within the feed pipe above the venturi and below the compressor, and in transmitting it to a common point at which begins another pipe supplying the closing chamber, while the opening chamber is connected to this same common point through, a throttling constriction which introduces a high pressure drop, and to the atmosphere through a dump pipe and pressure valve essentially comprising a flap valve capable of closing this pipe to the atmosphere and activated in the open direction by a calibrated spring and in the closed direction by the reference pressure or the intake pressure downstream of the venturi.

In this way, during the atmospheric phase, the dump valve is normally open under the effect of the return spring. When the supply pressure reaches a significant point, the weakness of the spring of the actuator allows said pressure, transmitted to the closing chamber, to close the dump valve, since the other chamber of the actuator is open to the atmosphere. On the other hand, when this pressure exceeds the regulating threshold, the pressure valve closes the outlet to the atmosphere of the opening chamber, so that the same pressure is gradually established in both chambers of the actuator, which then opens the valve by the action of the return spring.

This arrangement makes it possible to insert a high pressure drop reinforced by a check valve into the pipe joining the common point to the pressure valve so as to delay the opening of the dump valve during the supercharged phase. In addition, a solenoid the electric circuit of which is controlled by a contact activated by the gas pedal is inserted into said collection channel in such a way as to open the passage in this pipe only after the gas supply is fully opened, or a bit before. Lastly, a pressure switch opened by the pressure in the intake pipe below the butterfly valve when this pressure exceeds the danger threshold is inserted into this electric circuit.

In a preferred embodiment of the invention, a chamber forming a pressure reserve is also inserted into said collection channel, upstream of the solenoid.

In this way, the dump valve is normally open during the atmospheric phase, under the effect of the return spring, as above. When supercharging is required, the pressure in the pressure reserve is transmitted to the closing chamber, causing the dump valve to close since the other chamber of the actuator is open to the atmosphere. When the intake pressure exceeds the regulating threshold, the pressure valve shuts off the opening chamber's outlet to the atmosphere, so that equal pressure is gradually established in the two chambers of the actuator, which then opens the valve under the effect of a return spring.

The engine may thus operate in the atmospheric phase until the butterfly valve is fully open, at which point supercharging begins to take place.

In order to control the power of the engine in the supercharged phase in the preferred embodiment, the travel of the gas pedal is extended past the point at which the butterfly has been fully opened in order to allow an appropriate control to gradually increase the reaction of the pressure valve's spring from a low value to the maximum value allowed under stabilized operation. The exhaust back-pressure is thus limited to its maximum value over the entire range of operation.

In another embodiment, the power of the engine in the supercharged phase is controlled by the butterfly valve after it has been fully opened, through the operation of a switch having two stable positions and activated by the solenoid control circuit in such a way as to set up communication between the pressure reserve and the two chambers of the pneumatic actuator when the butterfly is fully open, and to break it thereafter only for a position corresponding to an average load, set so as to make available an adequate range of graduation. In this case, the pressure valve tends to regulate the reference pressure to a constant value.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
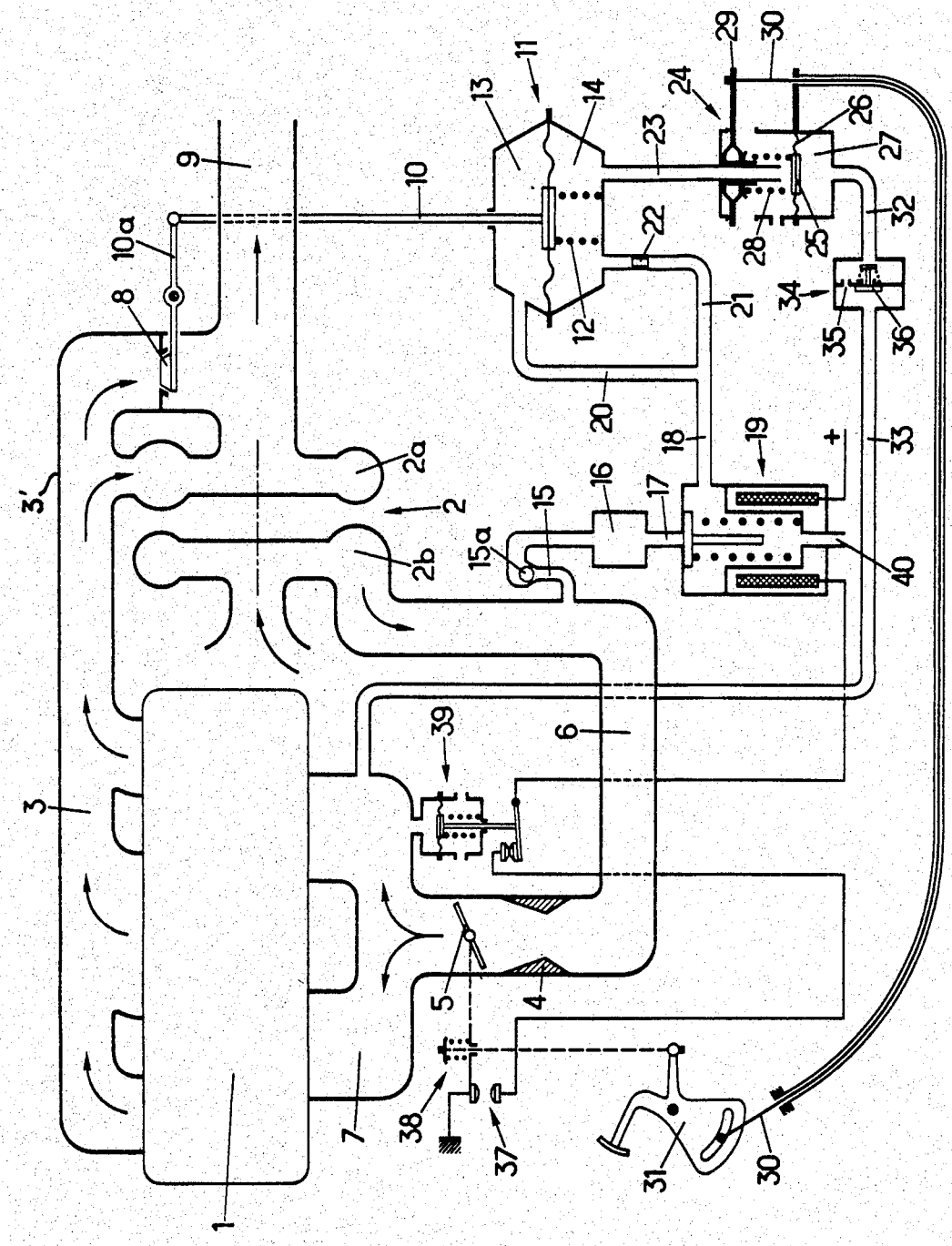
FIG. 1 is a schematic view of a preferred embodiment of the device of the present invention.

FIG. 1 thus shows engine 1 equipped with a turbocompressor 2 the turbine portion 2a of which is fed through the exhaust manifold 3 of the engine, while compressor portion 2b breathes in atmospheric air and feeds the usual butterfly valve 5 and venturi-equipped means 4 through delivery pipe 6. The butterfly valve 5 thus controls the flow of air admitted into intake manifold 7.

In known fashion, the assembly comprises a dump valve 8 allowing a larger or smaller fraction of, exhaust gasses from exhaust manifold 3 to pass directly into exhaust pipe 9 via bypass passage 3' without passing through turbine portion 2a. This valve 8 comprises a valve integral with a lever 10a connected to a rod 10 activated by pneumatic actuator 11, generally of the type having a diaphragm.

The actuator 11 comprises a return spring 12, although in contrast to the usual arrangement, this spring acts to open valve 8, and its calibration is relatively weak and not up to the supercharging pressure. Its diaphragm divides the acuator into a closing chamber 13, which when pressurized closes valve 8 against spring 12, and an opening chamber 14 which produces the opposite effect.

The pressure reigning in delivery pipe 6 upstream of venturi 4 is collected at point 15 and transmitted through a check valve 15a to a pressure reserve 16 which, through tube 17 and solenoid 19, feeds a common tube 18 off of which leads a tube 20 connected to closing chamber 13. Another tube 21 simultaneously feeds opening chamber 14, but through a throttling constriction 22 which causes a high pressure drop. This same opening chamber 14 communicates with the atmosphere through a tube 23 ending in a pressure or variable calibration valve 24 which consists essentially of a valve 25 activated by a diaphragm 26 to close the outlet to the atmosphere of tube 23 when the pressure under diaphragm 26 in control chamber 27 is sufficient to overcome the force of a return spring 28 tending to open the valve. The calibration of this spring is controlled through lever 29 activated through a cable 30 by gas pedal 31 so that its point of equilibrium will correspond to the supercharging pressure desired for stabilized operation.

This control chamber 27 is actually connected to intake manifold 7 through tubes 32 and 33 and a delay valve 34. The latter consists essentially of a severe pressure drop passage 35 set up in parallel with a check valve 36 so that the assembly imposes a high pressure drop only in the direction proceeding from tube 33 to tube 32.

Solenoid 19, preferentially controlled in the opening direction, is supplied through an electrical switch 37 connected to the gas pedal 31 through elastic compensating means 38 which closes the electrical circuit when butterfly valve 5 reaches a full open position and then activates cable 30 calibrating pressure valve 24. Also found in the electrical circuit proceeding from switch 37 to solenoid 19 are safety means 39 consisting of a pressure switch connected to intake manifold 7 downstream of the butterfly 5, which breaks the electric circuit when the pressure in the manifold reaches a dangerous level.

As long as butterfly value 5 is not fully open, switch 37 is open and the two chambers 13 and 14 of actuator 11 are exposed to the atmospheric pressure by solenoid 19, which closes tube 17 and and places common tube 18 into communication with the atmosphere through outlet 40. Under the effect of spring 12, flap valve 8 of the dump valve is open to a maximum degree, meaning that the back pressure at the exhaust of engine 1 is as low as possible in order to avoid any loss of efficiency. If the unit is equipped with an anti-pollution catalytic converter, it can be started quickly since the exhaust gasses are not cooled by passing through turbine stage 2a of turbocompressor 2.

On the other hand, when accelerator pedal 31 is sufficiently depressed to move butterfly valve 5 into a fully open position, switch 37 closes and energizes solenoid 19, which blocks outlet 40 to the atmosphere and places tubes 17 and 18 in communication. The supercharging pressure in reserve 16 is then transmitted to branchings 20 and 21. When the engine is operating at a stabilized speed, two operating speeds of the means for regulating the supercharging pressure must be distinguished.

If the pressure at intake manifold 7 is lower than the specified limit and corresponds to the calibration of spring 28 of pressure valve 24, the latter will maintain chamber 14 open to the atmosphere, with the pressure drop produced by throttling constriction 22 being much greater than that experienced in tube 23 and pressure valv 24. Because of the low calibration of spring 12, actuator 11 then closes dump valve 8, thereby placing turbocompressor 2 into operation.

When, following this commencement of operation, the engine passes over the threshold of the atmospheric phase and into the supercharged phase, as soon as the supercharging pressure exceeds the value set by the calibration of spring 28, which depends on the extent to which the accelerator pedal is depressed beyond the point corresponding to the fully open position of the butterfly valve, pressure valve 24 disconnects the outlet to the atmosphere via tube 23, causing the pressure in opening chamber 14 to gradually reach (through throttling constriction 22) the same value as the pressure in closing chamber 13, so that dump valve 8 is opened by spring 12.

In stabilized operation, dump valve 8 thus tends to assume an equilibrium position depending on the extent of depression of the accelerator pedal.

By contrast, during a phase of rapid acceleration, delay valve 34 only transmits the pressure at control chamber 27 after a certain delay, which improves the dynamic response of the assembly by delaying opening of dump valve 8 and by forcing engine 1 to operate temporarily at a supercharging speed greater than the regulating limit. Nevertheless, the real pressure in intake manifold 7 must not exceed the danger point during this period. This is controlled by safety means 39 which may come into play to cut off the power supply to solenoid 19 and thus open dump valve 8. All of the functions desired are thus obtained with relatively simple, automatic, and low-maintenance means.

Figure 2:
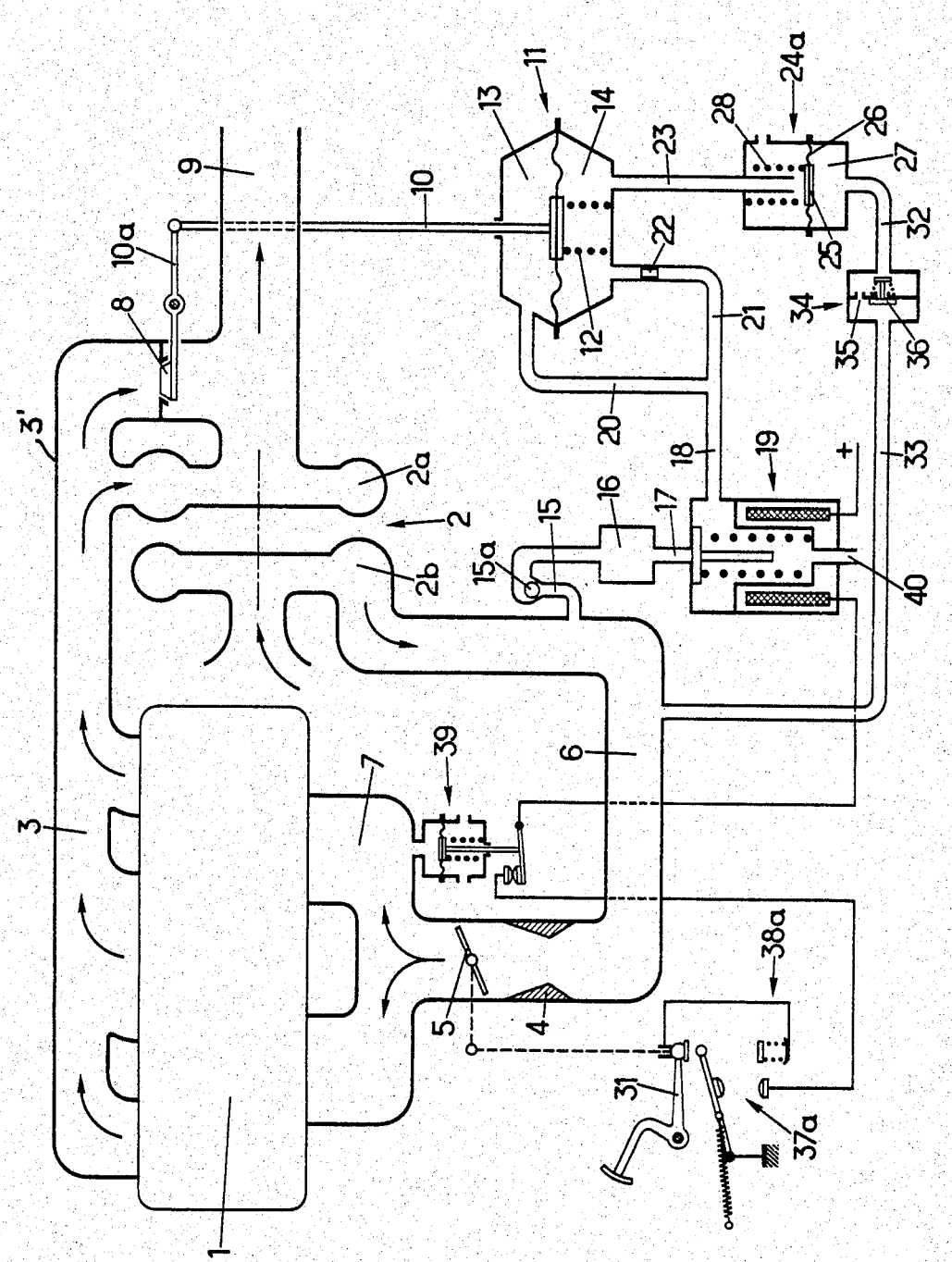
FIG. 2 is a view of a second embodiment.

The alternate embodiment represented in FIG. 2 is analogous to that of FIG. 1, but from which it is distinguished by the replacement of pressure or variable calibration valve 24 with a constant calibration valve 24a and by the replacement of simple switch 37 of FIG. 1 (the opening and closing points of which coincide with the full open position of the butterfly valve 5) with a switch 37a having two stable positions, which is closed when the butterfly valve is fully open and opened only after a delay, e.g., when the butterfly valve 5 returns to an intermediate position. In this example, the travel of the accelerator pedal 31 is limited to the position corresponding to full opening of the butterfly valve 5.

In the embodiment of FIG. 2, it is preferable to connect tube 33 not to manifold 7 but to pipe 6 so as to take as the reference pressure for control of pressure valve 24a the pressure delivery pipe 6 above the butterfly valve.

Spring 28 of valve 24a is precisely calibrated so that its point of equilibrium will correspond to the desired supercharging pressure in stabilized operation without being modified by the gas pedal 31.

Electrical switch 37a with two stable positions is linked to gas pedal 31 by elastic compensating means 38a which close the electric circuit when the butterfly valve 5 reaches a fully open position and then opens it only around the middle of the travel of the gas pedal. Safety means 39 are identical to the first case. When accelerator pedal 31 is depressed enough fpr butterfly valve 5 to be in fully open position, switch 37a closes and energizes solenoid 19, which blocks outlet 40 to the atmosphere and places tubes 18 and 18 in communication. The supercharging pressure in reserve 16 is then transmitted to the two branchings 20 and 21. When the engine is at stabilized operating speed, the device has the same two operating speeds as in the first case, except that the opening of the butterfly valve 5 may be only partial, while in the accelerating phase, the same operation and the same delay are obtained.

Figure 3:
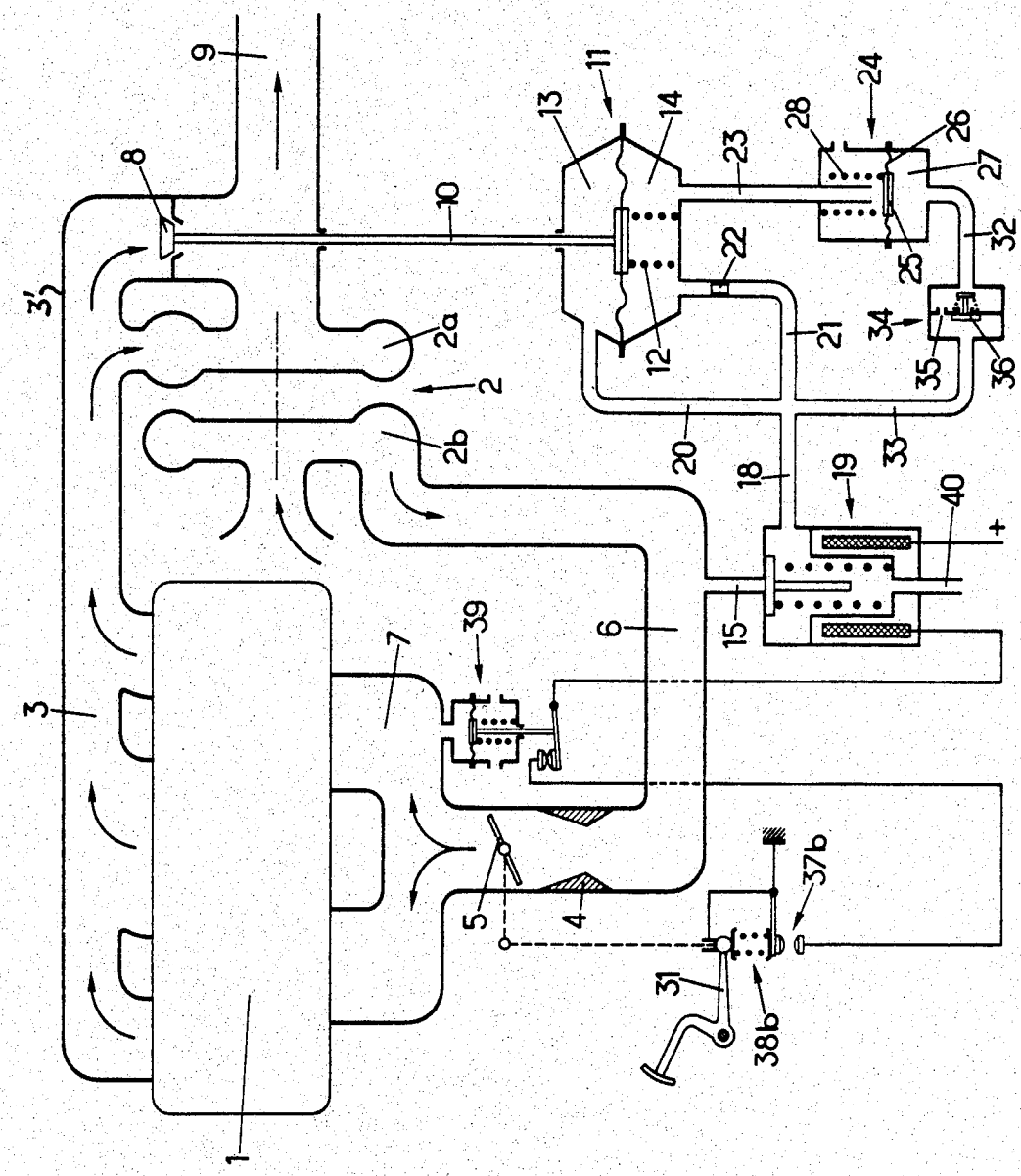
FIG. 3 is a view of a third embodiment.

The embodiment of FIG. 3 is distinguished from that of FIG. 2 by the absence of reserve 16 and check valve 15a, which means that collection pipe 15 plays the role of inlet 17 to solenoid 19, although it would also be possible to provide reserve 16 and check valve 15a in this case and by the direct connection of tube 33 to common tube 18 downstream of valve 19.

In addition, switch 37b and its elastic compensator 38b are of a simpler type than in the preceding examples and bring the supercharger into play by closing the circuit before butterfly valve 5 is fully open. With these exceptions, the operation is analogous to that in the preceding example.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for pneumatic control of supercharging pressure in a turbocompressed engine of the type including a turbocompressor, turbine of which is supplied through an exhaust of an engine to an exhaust pipe, a compressor which supplies an intake manifold of the engine through a delivery pipe and a butterfly valve positioned downstream of said delivery pipe, a bypass passage which interconnects said exhaust and said exhaust pipe so as to bypass said turbine, and a pneumatic actuator having a closing chamber and an opening chamber and which includes a return spring disposed in said opening chamber, comprising:

a dump valve located in said bypass passage and controlled by said pneumatic actuator;

first and second parallelly oriented tubes connected to said pneumatic actuator wherein said second tube includes throttling constriction means disposed therein and wherein said spring of the pneumatic actuator opens the dump valve;

collection pipe means for collecting the pressure in said delivery pipe upstream of the butterfly valve and downstream of the compressor and transmitting said pressure to said first and second parallel tubes, said first tube leading to the closing chamber of the pneumatic actuator and the second tube leading through said throttling constriction means to the opening chamber of said actuator;

pressure valve means for communicating with atmosphere and including a control chamber formed therein;

a third tube connecting said opening chamber of said actuator with said pressure valve means and atmosphere; and a fourth tube interconnecting the control chamber of said pressure valve means with said delivery pipe downstream of said butterfly valve wherein said pressure valve means further comprises a second spring calibrated such that an outlet portion of said third tube is closed to atmosphere when the pressure in the control chamber exceeds a predetermined desired value of the supercharging pressure.

2. An apparatus as claimed in claim 1, further comprising delay valve means disposed in said fourth tube wherein said delay valve means further comprises a check valve and second throttling constriction means for causing a high loss of pressure which is arranged in parallel with said check valve so as to cause a relatively strong reduction in flow only in the direction of said control chamber.

3. An apparatus as claimed in claims 1 or 2, further comprising:
   a gas pedal:
   an elastic compensator operatively associated with said gas pedal;
   a solenoid disposed in said collection pipe connecting said delivery pipe to said first and second tubes which places said first and second tubes in communication with atmosphere in a rest position, while establishing communication between said delivery pipe and said tubes in an excited position; and
   switch means for energizing said solenoid by the gas pedal through said elastic compensator.

4. An apparatus as claimed in claim 3, further comprising safety pressure switch means disposed within said intake manifold and downstream of said butterfly valve and which further comprises break contact means which is electrically connected to said switch means for energizing said solenoid.

5. An apparatus as claimed in claim 3, further comprising transmission means interconnected between said gas pedal and said pressure valve means wherein said fourth tube is connected to the intake manifold, calibration of said spring of said pressure valve means is changed remotely by said gas pedal through said transmission, and said switch means for energizing said solenoid is activated upon full opening of the butterfly valve such that when the gas pedal excessively travels beyond a fully open position, said transmission is activated.

6. An apparatus as claimed in claim 3, wherein said switch means for energizing said solenoid and said elastic compensator are positionable in first and second stable positions in which the contact is closed in the fully open position of the butterfly valve but opens again only after the butterfly valve partially closes.

7. An apparatus as claimed in claim 3, wherein said solenoid further comprises an outlet and said first, second and fourth tubes are connected to said outlet of said solenoid and wherein said switch means for energizing said solenoid and said compensator further comprise means for disconnecting said solenoid in closed and fully open positions of said gas pedal.

8. An apparatus as claimed in claim 5, further comprising check valve means and pressure reserve chamber means interconnecting said collection tube and an inlet portion of said solenoid.

* * * * *